United States Patent
Tewani et al.

(10) Patent No.: US 6,485,005 B1
(45) Date of Patent: Nov. 26, 2002

(54) HYDRAULIC MOUNT WITH GAS SPRING SUPPORTED DECOUPLER

(75) Inventors: Sanjiv G. Tewani, Lebanon, OH (US); James Eugene Dingle, Cincinnati, OH (US); Thomas Allen Baudendistel, Farmersville, OH (US); Mark W. Long, Bellbrook, OH (US); James Paul Hamberg, Tipp City, OH (US); Nancy Bowman McKinney, Dayton, OH (US); Ronald Alan Beer, Fairborn, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/706,093

(22) Filed: Nov. 3, 2000

(51) Int. Cl.⁷ .................................................. F16F 5/00
(52) U.S. Cl. ................................................ 267/140.13
(58) Field of Search ..................... 267/140.13, 140.11, 267/141.2, 141.4, 141.6, 141.7; 248/562, 636

(56) References Cited

U.S. PATENT DOCUMENTS

| | | | |
|---|---|---|---|
| 4,664,360 A | | 5/1987 | Sciortino |
| 4,762,309 A | * | 8/1988 | Hutchins ................. 267/140.1 |
| 4,840,358 A | | 6/1989 | Hoying et al. |
| 5,167,403 A | * | 12/1992 | Maramatsu et al. ... 267/140.13 |
| 5,205,546 A | | 4/1993 | Schisler et al. |
| 5,246,211 A | | 9/1993 | Klein et al. |
| 5,246,212 A | * | 9/1993 | Funahashi et al. ...... 267/140.13 |
| 5,314,173 A | * | 5/1994 | Ide et al. ................. 297/140.14 |
| 5,839,720 A | * | 11/1998 | Kojima ................... 267/140.14 |
| 5,911,412 A | * | 6/1999 | Durand et al. .......... 267/140.13 |
| 6,036,183 A | * | 3/2000 | Lee et al. ............... 267/140.13 |
| 6,082,718 A | * | 7/2000 | Yamada et al. ......... 267/140.14 |
| 6,199,838 B1 | * | 3/2001 | Cotter ...................... 267/64.28 |
| 6,199,842 B1 | * | 3/2001 | Gennesseaux et al. . 267/140.13 |
| 6,206,351 B1 | * | 3/2001 | Hamada et al. ......... 267/140.14 |

* cited by examiner

Primary Examiner—Christopher P. Schwartz
Assistant Examiner—Xuan Lan Nguyen
(74) Attorney, Agent, or Firm—Scott A. McBain

(57) ABSTRACT

A hydraulic engine mount includes opposed mounting members secured to an elastomeric body and a base, respectively, with an orifice plate assembly interposed the body and the base to define a pumping chamber and a reservoir for hydraulic fluid to flow therebetween through an orifice track formed by the orifice plate assembly. An elastomeric decoupler disk is secured in a recess formed between two orifice plates of the orifice plate assembly and defines a gas spring or cushion space which may be filled or vented by a removable plug in one of the orifice plates. Improved dynamic rate and damping at low amplitude inputs to the mount are provided by the gas cushion biased decoupler as compared with a decoupler type mount without the gas cushion bias. The mount provides an advantage over conventional decoupled hydraulic mounts in that very strict dimensional tolerances are relaxed and performance characteristics, as well as ease of manufacturing, are improved.

7 Claims, 3 Drawing Sheets

HYDRAULIC MOUNT WITH GAS SPRING SUPPORTED DECOUPLER

FIELD OF THE INVENTION

The present invention pertains generally to a hydraulic mount for vibration damping and, particularly, a vehicle engine hydraulic mount assembly including an air or gas spring supported decoupler which provides gradual transition from low dynamic stiffness to high dynamic stiffness.

BACKGROUND

Hydraulic vibration damping mounts are well known of the type that generate damping in a predetermined frequency range of vibrations by pumping a hydraulic fluid through an orifice track of predetermined dimensions. The dimensions of the orifice track are typically such that the hydraulic fluid resonates at certain frequencies of input vibration which can result in an increased level of dynamic stiffness of the mount. Hydraulic mounts may also be provided with devices known as decouplers which are disposed in a space formed within the mount orifice plate, for example, and allowed limited free travel within the space to short circuit the fluid from flowing through the orifice track, thus generating a low magnitude of dynamic stiffness necessary to provide isolation of certain vibrations. When the input vibration to the mount exceeds the allowable limit of the free motion of the decoupler, the hydraulic fluid flows through the orifice track thereby generating the mount damping characteristics.

In many hydraulic mount applications, the rate of change of dynamic stiffness of the mount near the tuned frequency should be gradual. However, hydraulic mounts without decouplers do not offer this performance feature, and conventional hydraulic mounts with decouplers must be fabricated with very tight dimensional tolerances of the decoupler and the orifice plate to obtain the desired dynamic stiffness characteristics. For mass produced hydraulic mounts, in particular, the tight dimensional tolerances typically result in a very high scrap rate and difficult manufacturing processes. It is to overcome the problems associated with prior art hydraulic mounts and to provide a mount with the desired dynamic stiffness characteristics near the frequency at which the hydraulic fluid goes into resonance that the present invention has been developed.

SUMMARY OF THE INVENTION

The present invention provides an improved hydraulic mount, particularly adapted as a hydraulic engine mount having improved dynamic stiffness characteristics.

In accordance with one aspect of the present invention, a hydraulic mount is provided which includes a decoupler supported or biased by a so-called air or gas spring. In particular, the decoupler is trapped between two orifice plates of an orifice plate assembly for the mount so that one side of the decoupler is in direct communication with a hydraulic pumping chamber of the mount and a layer of air or suitable inert gas is trapped between the other side of the decoupler and a wall surface of the orifice plate. The decoupler is preferably made from a flexible material, such as natural rubber. For low amplitude vibrations input to the mount, the gas spring arrangement provides resistance to motion of the decoupler and consequently the hydraulic fluid is pumped through the orifice track of the mount to generate damping and high dynamic stiffness. Near the frequency at which the hydraulic fluid goes into resonance, the dynamic stiffness of the mount with the gas spring supported decoupler changes gradually as compared with a corresponding mount with no decoupler.

In accordance with another aspect of the invention, a hydraulic mount is provided which includes an arrangement of a decoupler and a gas spring associated with the decoupler which is operable to change the decoupler performance characteristics from that of a conventional decoupled hydraulic mount and to avoid the tight dimensional tolerances required of conventional decoupled hydraulic mounts without sacrificing the mount performance characteristics.

In accordance with still a further aspect of the present invention, a hydraulic mount is provided with a decoupler which is provided with a gas spring or cushion which provides a dynamic rate increase under small displacement vibration inputs to the mount and thus behaves not unlike a non-decoupled mount. However, due to the allowable travel of the decoupler, the response is more linear and the perceived vibrations less harsh in many vehicle applications.

In accordance with yet another aspect of the present invention, a mechanically simple but improved hydraulic mount is provided which includes performance characteristics typically associated with hydraulic mounts with external control features. However, the mount of the present invention is a passive device which allows much larger dimensional tolerances of the mount parts without compromising performance.

Those skilled in the art will further appreciate the above-mentioned advantages and superior features of the present invention together with other important aspects thereof upon reading the detailed description which follows in conjunction with the drawing.

DETAILED DESCRIPTION OF A PREFERRED EMBODIMENT

Figure 1:
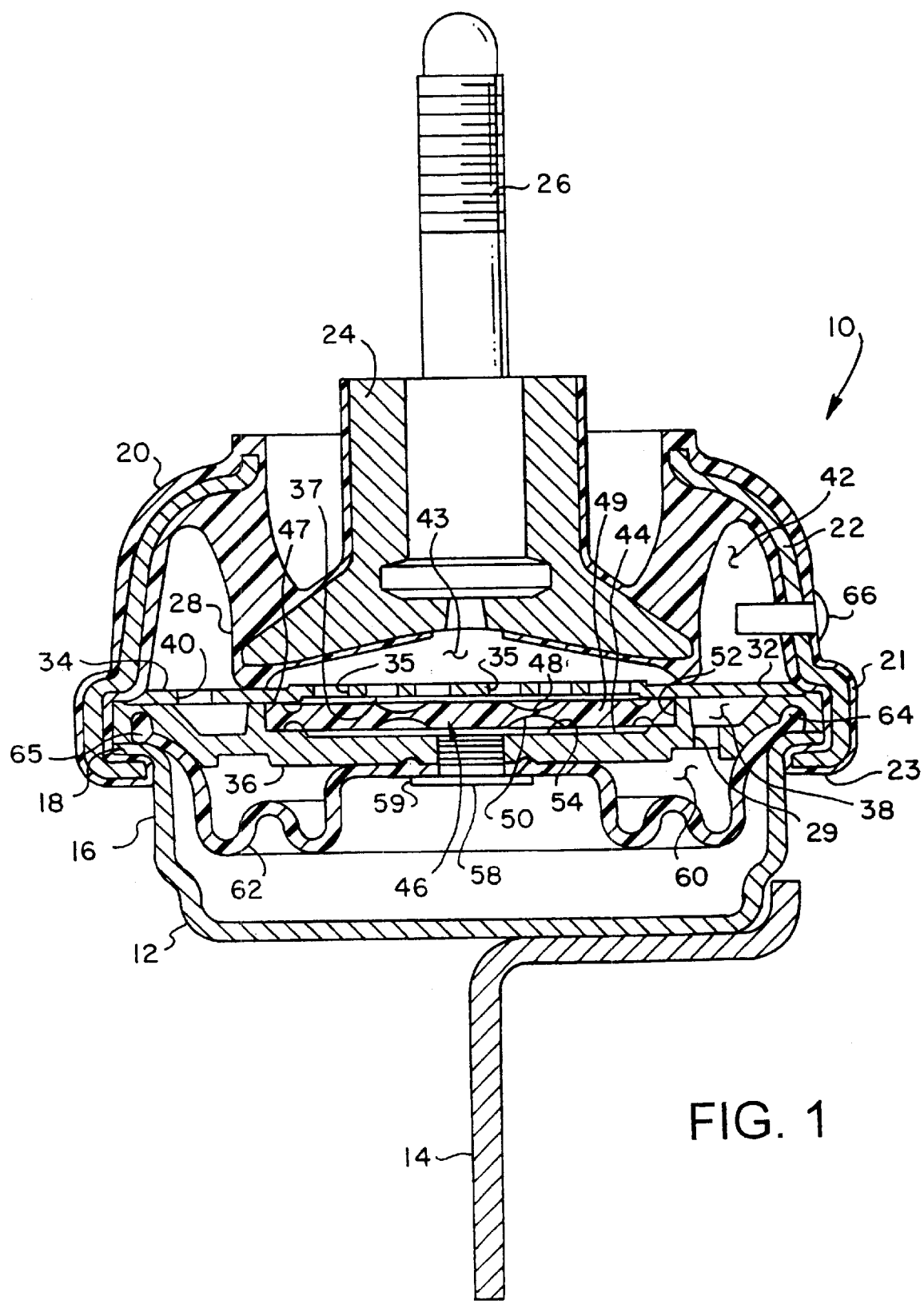
FIG. 1 is a longitudinal central section view of a hydraulic mount in accordance with the present invention.

In the description which follows, like parts are marked throughout the specification and drawing with the same reference numerals, respectively. The drawing figures are not necessarily to scale in the interest of clarity and conciseness.

Referring to FIG. 1, there is illustrated a hydraulic mount in accordance with the invention and generally designated by the numeral 10. The mount 10 includes a generally cylindrical cup shaped formed metal base member 12 suitably secured to a mounting member or bracket assembly 14 in a conventional manner. The base member 12 includes a peripheral sidewall 16 and a circumferential radially outwardly projecting flange 18. The mount 10 is further characterized by a generally cylindrical molded elastomer body 20 which is reinforced by a suitable metal core part 22. The body 20 is molded to a central metal hub member 24 which supports a threaded mounting member 26 for connecting the mount 10 to an engine assembly or the like. The elastomer body 20 includes a central, generally cylindrical depending portion 28 which, in the position shown, is engageable with an orifice track assembly 32 including an upper, generally planar cylindrical orifice plate 34 and a lower, generally planar cylindrical orifice plate 36. Orifice plates 34 and 36 are shown in assembly to define an annular passage or orifice track 38 which opens through a port 40 to a fluid pumping chamber 42 formed between the body 20. and the orifice plate assembly 32. A circumferentially spaced port 29 communicates hydraulic fluid between orifice track 38 and a second fluid chamber or reservoir 60.

Lower orifice plate 36 also defines a generally cylindrical central recess 44 in which is disposed an elastomeric cylindrical disk shaped decoupler member 46 which is dimensioned to include opposed, shallow annular recess or channel portions 48 and 50. Recess 44 is defined by a peripheral outer wall 52 and a reduced diameter generally planar bottom wall surface 54 which is relieved to provide a space between wall surface 54 and the main disk shaped body portion 49 of decoupler 46, as shown. The decoupler 46 is also characterized by a circumferential rim part 47 which is trapped in fluid tight sealing engagement between the upper orifice plate 34 and the lower orifice plate 36. However, a major part of the body 49 of the decoupler 48 radially inward of the rim 47 is allowed limited space within the recess 44 between the wall surface 54 and the upper orifice plate 34. Upper orifice plate 34 is also provided with a relieved cylindrical wall surface 37 to provide space between decoupler 46 and orifice plate 34 except at the rim 47. In this regard, the space defined between the wall surface 54 and the decoupler 46, for example, may be filled with air or a suitable inert gas. A fluid tight plug 58 is shown disposed in a suitable opening formed in the lower orifice plate 36 and is shown in its working position forming a seal so that air or other gas trapped in the aforementioned space between the decoupler 46 and the wall surface 54 will not escape. Plug 58 also includes a flange 59 engaged with a central hub portion of a generally cup shaped flexible elastomer diaphragm 62.

The hydraulic mount 10 is shown in a relaxed position wherein the cylindrical body portion 28 of the elastomer body 20 rests on the orifice plate 34. However, under operating conditions, hydraulic fluid is also present in a pumping chamber portion 43 which is in direct communication with the chamber 42. Moreover, as mentioned above, the decoupler member 46 is dimensioned such that there is some free space for movement between the decoupler and the orifice plates 34 and 36. Suitable passages 35 are formed in the orifice plate 34 to allow communication of fluid between the chamber portion 43 and the space between the decoupler 46 and the orifice plate 34.

The hydraulic mount 10 also includes the aforementioned fluid reservoir 60 defined by and between flexible diaphragm 62 and the orifice plate 36. The diaphragm 62 includes a circumferential rim portion 64 which is shown nested in a suitable annular groove 65 formed in the lower orifice plate 36.

As further shown in FIG. 1, the mount 10 may be assembled by trapping the rim 64 of the diaphragm 62 between the flange 18 of the base member 12 and the periphery of the orifice plate 36. The orifice plates 34 and 36 are also held in fluid tight assembly with each other at their peripheral edges by a circumferential rim portion 21 of the body 20 which is suitably displaced to form a radially inwardly directed peripheral flange 23 contiguous with the base member flange 18. A suitable rivet type plug 66 projects through the wall of the body 20 and closes a fill port for filling the pumping chamber 42, 43 and the reservoir chamber 60 with a suitable hydraulic fluid, such as a mixture of water and ethylene glycol.

Figure 2:
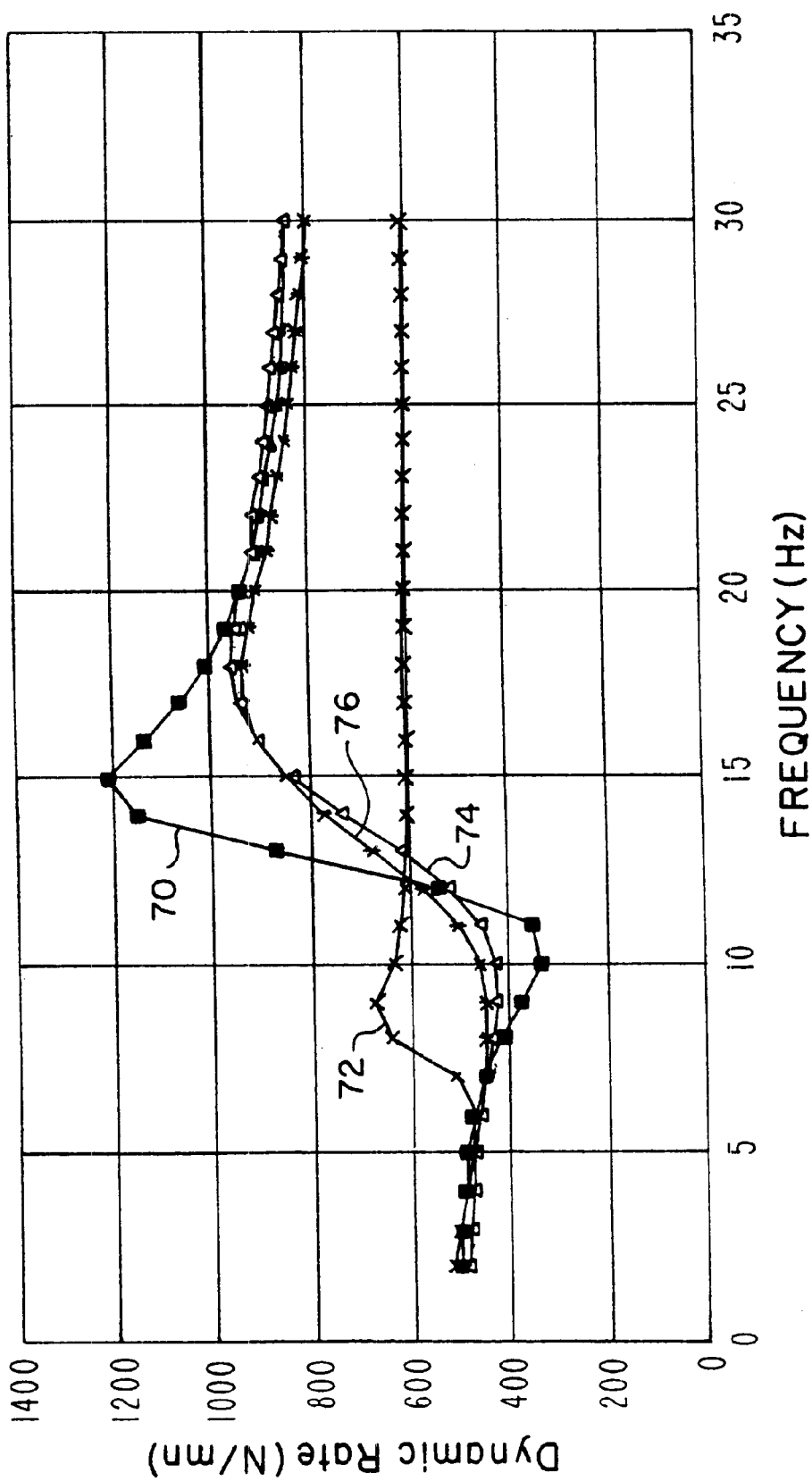
FIG. 2 is a diagram showing dynamic rate versus vibration frequency for the mount of the present invention under large and small amplitude vibrations as compared with a conventional decoupled mount without the gas spring feature.
Figure 3:
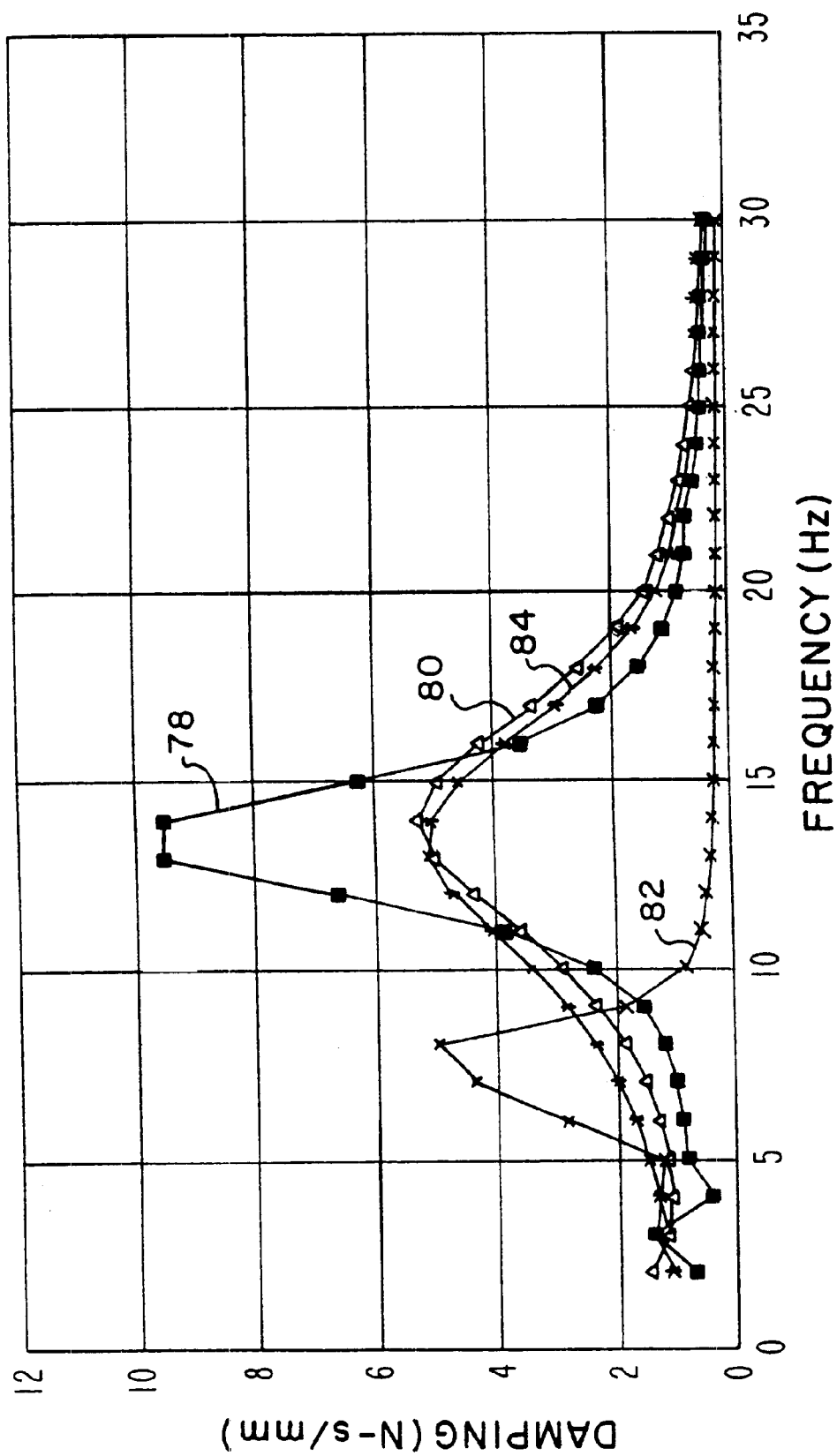
FIG. 3 is a diagram of damping characteristics versus vibration frequency for the mount of the present convention under the same minimum and maximum amplitudes of vibration and as compared with a decoupled mount without the gas spring.

FIGS. 2 and 3 demonstrate the performance characteristics of the embodiment of the mount 10 shown in FIG. 1 and indicating the dynamic rate and the damping characteristics, particularly for low amplitude vibrations, as compared to a conventional decoupled hydraulic mount of similar dimensions with no gas spring or gas cushion feature. As shown in FIG. 2, curve 70 indicates a much higher dynamic rate in a frequency range of about 12.5 to 17 Hz for 0.1 millimeter (mm) peak to peak vibrations, as compared with the same amplitude of vibrations for a mount with no gas spring or cushion formed between a decoupler and orifice plate assembly. Curve 72 shows the characteristics of a mount with no gas spring for 0.1 millimeter peak to peak vibrations. Large amplitude (1.0 millimeter peak to peak) vibrations at various frequencies for the mount with the gas spring, such as the mount 10, are shown by curve 74 as compared with the same amplitude vibrations for a mount without the gas spring, as indicated by curve 76.

FIG. 3 also demonstrates the advantageous damping characteristics of the mount 10 for low amplitude (0.1 mm peak to peak) vibrations, as indicated by curve 78. Large amplitude (1.0 mm peak to peak) vibrations are indicated by curve 80 for the mount 10 as compared with low amplitude and high amplitude vibrations for a decoupled mount without the gas spring, as indicated for the curves 82 and 84.

The compression of gas in the space between the decoupler 46 and the wall surface 54 slightly stiffens the decoupler. However, this small change in stiffness is sufficient to divert the flow of hydraulic fluid to the track 38 under small displacements so that fluid may flow between the chambers 42, 43 and 60 by way of the track 38 and circumferentially spaced orifices 28 and 29, as shown in FIG. 1. At larger displacements, the mount 10 exhibits a performance essentially the same as a mount without the gas spring or gas cushion described above. It is evident from FIGS. 2 and 3 that small amplitude displacements result in vastly different performance characteristics, but the gas spring supported decoupler offers no significant change in mount performance at larger amplitude vibrations.

The total stiffness of the decoupler 46 is a function of the volume of air or gas trapped in the space between the decoupler 46 and the wall surface 54 and the flexibility of the decoupler member itself. For small amplitude vibrations or displacements, the decoupler 46 stretches but does not travel to its positive stops between the relieved wall surfaces 37 and 54 of the upper and lower plates 34 and 36.

Those skilled in the art will appreciate from the foregoing description and the drawing figures that the mount 10, being of a decoupled type, responds to inputs in a manner which is softened versus a non-decoupled mount of the same general configuration. The gas cushion or gas spring provided for the mount 10 provides a rate increase under small displacements not unlike a non-decoupled mount, but because of the allowable travel of the decoupler 46, the response is more linear and less harsh. Of course, the orifice track 38 is subject to design variations with predetermined cross-sectional areas and length depending on the design tuning frequency.

Still further, the configuration of the mount 10 exhibits damping forces much lower than a non-decoupled mount since some of the fluid within the mount deflects the decoupler 46. The pumping stiffness of the chamber 42, 43 is modified by the decoupler and gas spring stiffness resulting in a softer feel in a vehicle wherein the engine is supported by mounts such as the mount 10. As previously mentioned, the orifice plates 34 and 36 are dimensioned such that sufficient motion of the decoupler 46 is allowed without the decoupler impinging strongly on the orifice plates. When the input amplitude is sufficient to move the decoupler 46 forcibly against the wall surface 54, the pumping stiffness of the mount 10 increases further and all additional pumping pushes fluid through the orifice track 38.

The construction and operation of the mount 10 is believed to be understandable to those of ordinary skill in the art. Conventional engineering materials may be used in constructing the mount 10. In particular, in fabricating the mount 10, the decoupler 46 is preferably assembled to the plate assembly 32 before the plug 58 is inserted in its bore in the plate 36. The gas spring or gas cushion space between wall surface 54 and decoupler 46 may be slightly pressurized before insertion of the plug, if desired. However, under ambient conditions and with suitable predetermined dimensions of the plates 34 and 36 and the decoupler 46, sufficient space is provided between the decoupler and the wall surface 54 to allow sufficient air or other inert gas to reside. The gas cushion space is thus isolated once the mount 10 has been assembled.

Although a preferred embodiment of the invention has been described in detail herein, those skilled in the art will recognize that various substitutions and modifications may be made to the invention without departing from the scope and spirit of the appended claims.

What is claimed is:

1. A hydraulic mount for an operating component of a vehicle comprising:

first and second mounting members;

a body connected to one of the mounting members and a base connected to the other of the mounting members;

an orifice plate assembly;

a pumping chamber formed between said body and said orifice plate assembly and a reservoir formed between said orifice plate assembly and a member interposed said orifice plate assembly and said base;

a decoupler supported by said orifice plate assembly and in fluid communication with said pumping chamber, wherein said orifice plate assembly includes a first orifice plate including a plurality of openings therein for providing fluid communication between said pumping chamber and said decoupler and a second orifice plate, a recess between said orifice plates for receiving said decoupler, said decoupler being secured in said recess in fluid tight sealing engagement with a wall delimiting said recess;

a gas cushion formed between said decoupler and said orifice plate assembly and operable to damp relatively low amplitude vibrations in a predetermined frequency range; and a plug removably mounted on said second orifice plate for communicating gas to a space formed between said decoupler and said second orifice plate, wherein said plug includes a part operable to secure a hub of said member interposed said orifice plate assembly and said base between said plug and said second orifice plate.

2. The mount set forth in claim 1 wherein:

said orifice plate assembly is interposed said body and said base.

3. The mount set forth in claim 1 including:

an orifice track formed by said orifice plate assembly for transferring fluid between said pumping chamber and said reservoir.

4. The mount set forth in claim 1 wherein:

said member interposed said orifice plate assembly and said base comprises a flexible diaphragm delimiting said reservoir.

5. The mount set forth in claim 1 wherein:

said decoupler comprises an elastomeric disk having an outer rim dimensioned to be forcibly engaged with said orifice plate assembly to provide a fluid tight seal to prevent leakage of gas from said space between said decoupler and said second orifice plate.

6. The mount set forth in claim 5 wherein:

said decoupler includes a body and an annular recess formed therein and defining part of said space.

7. A hydraulic mount for an operating component of a vehicle comprising:

first and second mounting members;

a body connected to one of the mounting members and a base connected to the other of the mounting members;

an orifice plate assembly interposed said body and said base;

a pumping chamber formed between said body and said orifice plate assembly and a reservoir formed between said orifice plate assembly and a flexible diaphragm interposed said orifice plate assembly and said base;

an orifice track formed by said orifice plate assembly for transferring fluid between said pumping chamber and said reservoir;

a flexible disk shaped decoupler member supported by said orifice plate assembly and in fluid communication with said pumping chamber;

a gas cushion formed by a space between said decoupler member and said orifice plate assembly and operable to damp vibrations in a predetermined frequency range; and a plug removably mounted on said orifice plate assembly for communicating gas to said space between said decoupler member and said orifice plate assembly, wherein said plug includes a part operable to secure a hub of said diaphragm between said plug and said orifice plate assembly.

* * * * *